J. E. SEARS.
VALVE FOR INTERNAL COMBUSTION ENGINES.
APPLICATION FILED FEB. 2, 1910.

1,011,861.

Patented Dec. 12, 1911.
3 SHEETS—SHEET 1.

Inventor:
John Edward Sears

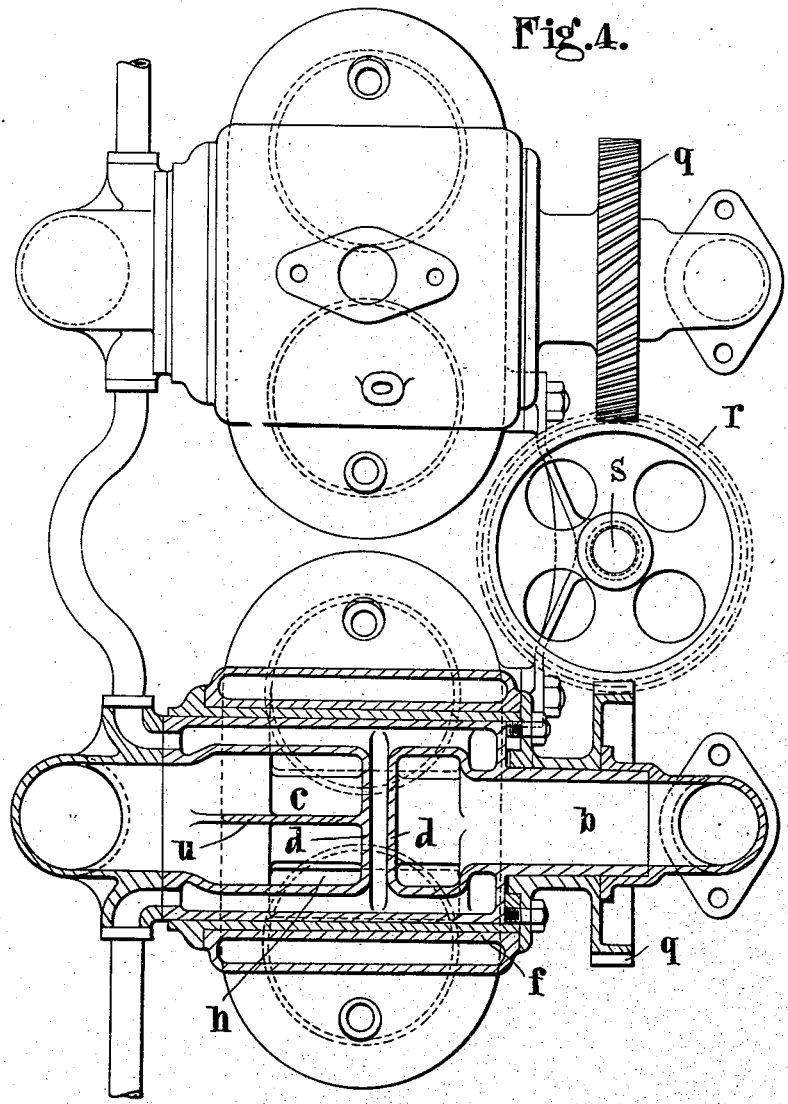

UNITED STATES PATENT OFFICE.

JOHN EDWARD SEARS, OF HENDON, ENGLAND.

VALVE FOR INTERNAL-COMBUSTION ENGINES.

1,011,861.  Specification of Letters Patent.  Patented Dec. 12, 1911.

Application filed February 2, 1910. Serial No. 541,529.

*To all whom it may concern:*

Be it known that I, JOHN EDWARD SEARS, a subject of the King of Great Britain and Ireland, residing at Rydal Mount, Holder's Hill, Hendon, county of Middlesex, England, architect, have invented certain new and useful Improvements in Valves for Internal-Combustion Engines, of which the following is a specification.
This invention relates to rotary cylindrical valves for internal combustion engines of the four stroke cycle type and has for its objects to simplify the valve construction and improve the arrangement of the valve mechanism, to reduce the working parts and the driving power required to a minimum, to eliminate the probability of valve distortion and to generally increase the compactness, reliability and efficiency of the engine.

According to the present invention the opening and closing of the working cylinders of the engine to admission and exhaust is controlled by a short tubular valve working in a valve cylinder with open ends and divided by a partition into two compartments communicating with the inlet and exhaust pipes respectively through the open ends of the valve cylinder. The valve operates by a motion of simple rotation, the valve gearing being mounted on one end of the valve in such a manner as to leave both admission and exhaust compartments free of all obstruction, thus securing free ingress and egress for the gases. This construction and arrangement and the use of a short tubular valve materially reduce the possibility of valve distortion.

Figure 1:
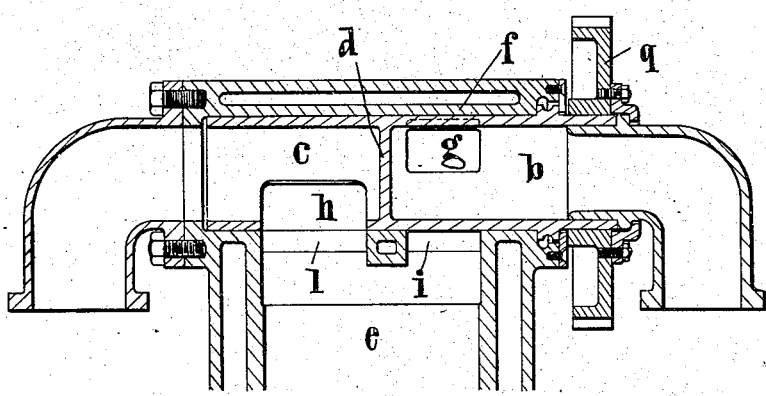
Figure 2:
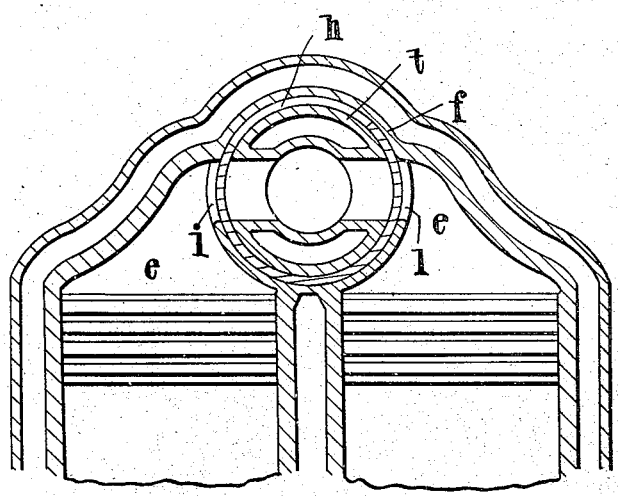
Figure 3:
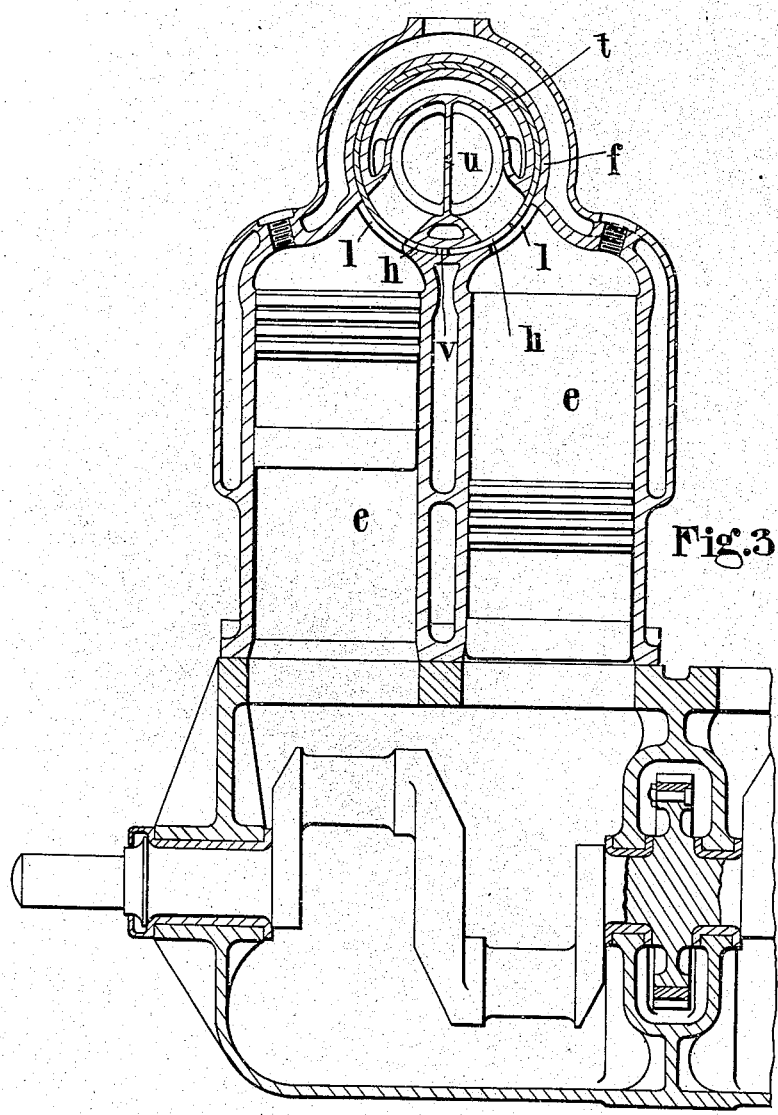

The above arrangement may in some cases be modified by the provision of a fixed inner cylinder arranged in concentric relation to the valve cylinder so that the valve rotates between two cylindrical surfaces, the transverse partition being placed in the fixed inner cylinder instead of in the valve itself. The fixed inner cylinder may, if desired, be water-jacketed to protect the valve from the extreme heat of the gases and from corrosion.
In multi-cylinder engines the valve cylinder is preferably placed transversely to the line of the working cylinders so that one short tubular valve controls the admission and exhaust of two working cylinders.
In the accompanying drawings, in which similar parts are marked with like reference letters, Figure 1 is a sectional elevation showing the application of one form of valve to a vertical engine of the four stroke cycle type having one working cylinder. Fig. 2 is a cross sectional elevation through the exhaust end of the valve showing the application of another form of valve to a vertical engine of the four stroke cycle type having two cylinders, the pistons of which move synchronously in the same direction. Figs. 3 and 4 are a cross sectional elevation through the exhaust end of the valve and a part sectional plan respectively, showing the application of the invention to a vertical engine of the four stroke cycle type having four cylinders.

In carrying the invention into effect in one convenient manner, a single rotating cylinder $a$, divided into two compartments $b$ and $c$ by a transversely arranged partition $d$, forms and operates as both the admission valve and the exhaust valve. Arranged horizontally above the head or heads of the working cylinders $e$ of the engine is the fixed cylinder $f$, in which the valve $a$ works. In multi-cylinder engines the cylinder $f$ is preferably arranged transversely to the axis of the crank-shaft so that one cylindrical valve can operate for two cylinders. In the admission chamber $b$ of the valve $a$ is a suitably shaped port $g$ while the exhaust chamber $c$ is also provided with a suitably shaped port $h$. The valve cylinder $f$ is provided with two ports $i$ and $l$, with which the ports $g$ and $h$ function to control the admission and exhaust respectively. The dividing wall separating the ports $i$ and $l$ in the valve cylinder $f$ may in some cases be dispensed with, thus forming one port, the separate admission and exhaust ports in the tubular valve being retained.

The valve cylinder $f$ is in communication with the inlet pipe $m$ at one end and the exhaust pipe $n$ at the other end by suitable connections so that the compartment $b$ of the valve communicates with the inlet pipe $m$ and the compartment $c$ with the exhaust pipe $n$.

The valve $a$ is rotated from the crank shaft by any suitable gearing, a convenient form being a skew gear wheel $q$ mounted on one end of the valve and surrounding the inlet pipe $m$ and a similar gear wheel $r$ gearing with it and carried by a shaft $s$ driven by the crank-shaft by skew or other suitable gear wheels. In multi-cylinder engines the shaft carrying the gear wheel *r* may be so located that the wheel *r* would drive two rotating valves as shown in Fig. 4.

When a fixed inner valve cylinder *t* is employed as shown in Figs. 2 and 3, the transverse partition *d* is arranged in the inner valve cylinder instead of in the valve itself, and the inner cylinder *t* is provided with ports *o* and *p* which correspond with the ports *i* and *l* in the valve cylinder *f*, and the inlet and exhaust pipes *m* and *n* are connected to the ends of the inner cylinder *t*.

Either the outer valve cylinder *f* as shown in Fig. 1, or the inner valve cylinder *t* with its transverse partition or both valve cylinders as shown in Figs. 2, 3 and 4, may be water-jacketed, the walls of the valve cylinders being constructed hollow and suitable water connections being provided for this purpose.

When the exhaust ports *l* are arranged as shown in Figs. 3 and 4, and the two cylinders fire in sequence, either the valve *a* or the fixed inner cylinder *t* as the case may be, is provided with a longitudinal partition or baffle-plate *u* to prevent back pressure in one cylinder from the exhaust of the other, and a bar or bridge *v* may be provided in the exhaust port of the valve for the same purpose. Oilways and grooves are provided in the tubular valve and in the valve cylinders for the purpose of lubrication, which in itself is a means for rendering the valves gas-tight. Additional protection against gas leakage may be provided, if desired, by forming grooves in suitable positions in the valve cylinders, in which grooves are fitted plates or bars resting on springs which exert a pressure causing the bars or plates to constantly contact with the tubular valve.

Having thus described my invention, what I claim as new and desire to secure by Letters Patent is:—

1. Valve mechanism for internal combustion engines of the four stroke cycle type comprising an outer fixed valve cylinder having ports communicating with the working cylinder of the engine, an inner valve cylinder fixed in concentric relation to the outer valve cylinder and provided with ports corresponding with the ports in the outer cylinder, and having open ends communicating with the inlet and exhaust pipes, a transverse partition in said inner fixed valve cylinder, a short tubular valve rotating between the inner and outer fixed valve cylinders and provided with ports, and means for rotating the tubular valve from the crank-shaft of the engine.

2. Valve mechanism for internal combustion engines of the four stroke cycle type comprising a fixed outer valve cylinder provided with ports communicating with the working cylinder of the engine, a water jacket for said outer valve cylinder, an inner valve cylinder fixed in concentric relation to the outer valve cylinder having open ends communicating with the inlet and exhaust pipes, and provided with ports corresponding to the ports in said outer valve cylinder, a water jacket for the said inner valve cylinder, a transverse partition in said inner valve cylinder, a short tubular valve provided with ports and rotating between the inner and outer valve cylinders, and means for rotating the tubular valve from the crank-shaft of the engine.

3. Valve mechanism for internal combustion engines of the four stroke cycle type comprising a water-jacketed outer valve cylinder provided with ports communicating with the working cylinders of the engine, an inner water-jacketed valve cylinder having open ends communicating with the inlet and exhaust pipes, said inner valve cylinder being fixed in concentric relation to the outer valve cylinder and being provided with ports corresponding to the ports in the outer valve cylinder, a water-jacketed transverse partition in the inner valve cylinder, a longitudinal partition separating two exhaust ports in said inner valve cylinder, a short tubular valve rotating between the inner and outer valve cylinders, and means for rotating said tubular valve from the crank-shaft of the engine.

4. Valve mechanism for internal combustion engines of the four-stroke cycle type comprising a fixed outer valve cylinder provided with ports communicating with the working cylinder of the engine, an inner valve cylinder fixed in concentric relation to the outer valve cylinder having open ends communicating with the inlet and exhaust pipes and provided with ports corresponding to the ports in said outer valve cylinder, a water jacket for the said inner valve cylinder, a transverse partition in said inner valve cylinder, a short tubular valve provided with ports and rotating between the inner and outer valve cylinders, and means for rotating the tubular valve from the crank shaft of the engine.

In testimony whereof, I affix my signature in presence of two witnesses.

JOHN EDWARD SEARS.

Witnesses:
GEORGE TAPPING,
GEORGE I. BRIDGES.